Figure 1:
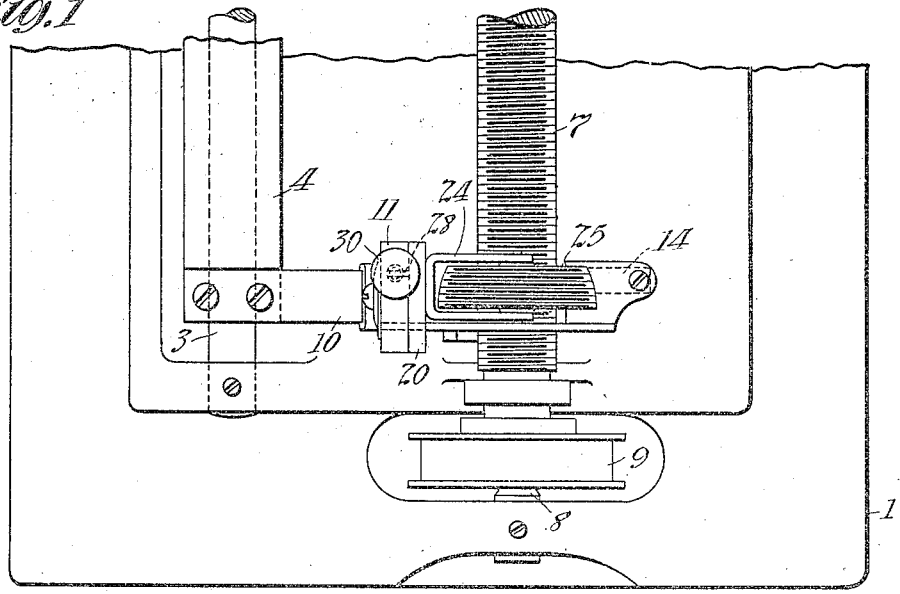

H. WOLKE.
FEEDING MECHANISM FOR PHONOGRAPHS.
APPLICATION FILED JAN. 20, 1908.

936,274.

Patented Oct. 5, 1909.

2 SHEETS—SHEET 1.

Witnesses:
Frank D. Lewis
H. H. Dyke

Inventor:
Herman Woeke
by Frank L. Dyer
Atty.

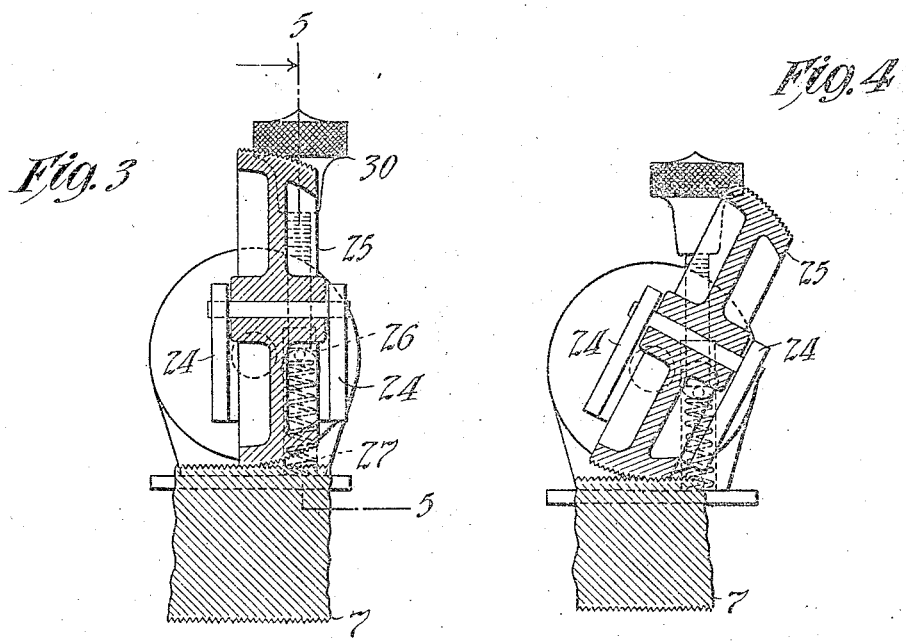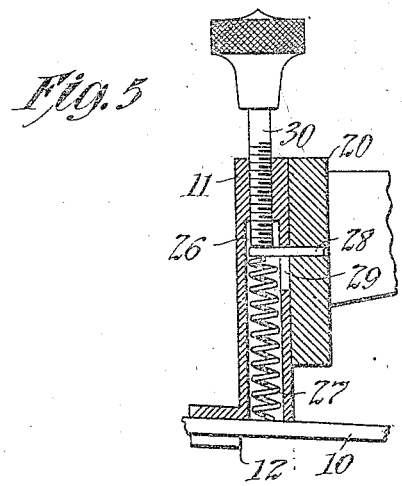

UNITED STATES PATENT OFFICE.

HERMAN WOLKE, OF ORANGE, NEW JERSEY, ASSIGNOR TO NEW JERSEY PATENT COMPANY, OF WEST ORANGE, NEW JERSEY, A CORPORATION OF NEW JERSEY.

FEEDING MECHANISM FOR PHONOGRAPHS.

936,274.

Specification of Letters Patent. Patented Oct. 5, 1909.

Application filed January 20, 1908. Serial No. 411,837.

*To all whom it may concern:*

Be it known that I, HERMAN WOLKE, a citizen of the United States, residing at Orange, in the county of Essex and State of New Jersey, have invented certain new and useful Improvements in Feeding Mechanisms for Phonographs, of which the following is a description.

My invention relates to improvements in feed mechanisms for phonographs of the type disclosed in applications for Letters Patent, filed January 3, 1907, Serial No. 350,648 and Serial No. 350,649, wherein the feed screw of the phonograph or other talking machine is engaged by a rotating threaded nut, whereby the rotation of the nut will effect the feeding movement of the carriage at a slower rate than a direct feed of the screw; provision also being made in the latter application above referred to for disengaging the threaded nut from the feed screw and substituting a fixed nut to permit of a direct feed of the carriage at a higher rate. In the manufacture of phonographs in which very fine feed screws are used, a mistake is sometimes made in the cutting of the thread, in which case the operation is begun over again on a reduced diameter of the stock, from which it results that the diameter of the finished screw is not always uniform. Lack of uniformity in this respect is also due to variations in the diameter of the stock to be operated on, amounting in the extreme to a few thousandths of an inch. Such variation in diameter of the feed screws are not important in a device in which a direct feed is used, because the longitudinal movement effected by the screw will be independent of the diameter thereof, but these variations are of consequence in a device of the type referred to, because with such an arrangement the differential movement depends not only upon the pitch of the screw, but also upon the relative diameter of the screw and the rotating nut.

My present invention provides, and it is my object to provide, an arrangement by means of which variations in the diameters of the feed screws can be properly compensated and in a broad sense the invention consists in effecting this compensation by varying the diameter of the rotating nut. Preferably, this is effected by providing the nut with a convex threaded surface, the maximum and minimum diameters of which shall be sufficient to include the extreme variations in diameter of the screw encountered in practice, whereby the position of the nut may be adjusted to permit an engagement of its threaded part at the desired diameter to secure the exact feed required. This adjustment of the threaded nut is preferably effected by varying its angle to permit the convex threaded surface thereof to engage the feed screw at the desired point, corresponding to the diameter of the nut.

In order that the invention may be better understood, attention is directed to the accompanying drawings forming part of this specification, and in which—

Figure 2:
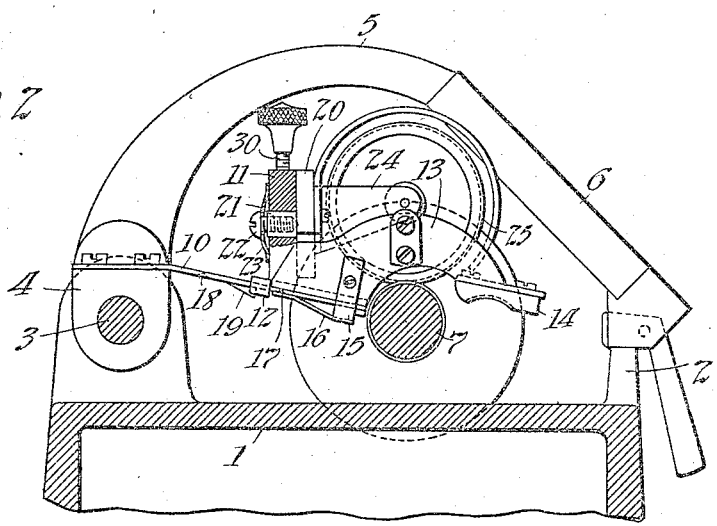

Figure 1 represents a plan view of a portion of the Home phonograph with my present improvements applied thereto, the guard which partially encircles the threaded nut being removed for the purpose of clearness; Fig. 2 a sectional view of the same with the guard in place; Fig. 3 an enlarged sectional view illustrating the feed screw and rotating nut, with the latter engaging the feed screw on the line of its maximum diameter; Fig. 4 a corresponding view showing the nut engaging the feed screw on the line of its minimum diameter; and Fig. 5 a section on the line 5—5 of Fig. 3.

In all of the above views corresponding parts are represented by the same numerals of reference.

The phonograph is provided with the usual bed plate 1, straight edge 2, guide rod 3, traveling sleeve 4 and arm 5, formed with an eye 6, which receives the recorder or reproducer, the said arm resting at its forward end on the straight edge 2. The feed screw 7 is mounted in the usual way on centers 8, and is driven by a pulley 9, said feed screw carrying the usual mandrel (not shown). Ordinarily, a leaf spring is secured to the sleeve 4, and carries a nut at its forward end, which engages the feed screw so as to feed the carriage at a rate depending upon the pitch of the screw, but with my present attachments, this spring and nut are removed. Secured to the sleeve 4 is a comparatively stiff leaf spring 10, the main portion of which extends substantially diametric to the feed screw and mounted upon this leaf spring is a block 11, provided with fingers 12, which extend around the edges of the spring 10, so as to permit the block to be moved lengthwise of the spring, as will be understood. Secured to the side of the block 11, is a plate 13, carrying a feed nut 14, at its end. The plate 13 carries a depending finger 15, to which is secured a spring arm 16, formed with a small boss 17, adapted to engage the recesses 18, on the underside of the spring 10, so as to lock the parts in either of their extreme positions. A stop 19 limits the rearward movement of the block 11. Mounted on the front face of the block 11 is a plate 20, having a boss 21, which extends through an opening in the block and engaging said boss is a screw 22, between the head of which, and the block 11, a spring washer 23, is interposed, whereby the plate 20, will be held firmly in engagement with the face of the block 11. The plate 20 is formed with two arms 24—24, between which is pivoted the rotating nut 25, whose periphery is formed with a thread as shown, of opposite pitch to that of the screw 7. The threaded periphery of the nut 25 is convexed and this convexity is sufficient to include within its varying diameter a sufficient variation to compensate for the usual variations in the diameter of the feed screws 7, so that by adjusting the nut from the position shown in Fig. 3 to that shown in Fig. 4, the proper diameter will be secured for coöperation with the particular screw with which it may be used to give the desired differential feed. This adjustment of the nut is effected by the moving of the plate 20 pivotally on the boss 21. I provide the block 11 with a vertical chamber 26 therein, in which is located a spiral spring 27 engaging with a pin 28, carried by the plate 20, and working in a slot 29 formed in the block 11. Engaging above the pin 28 is an adjusting screw 30, which may be moved up and down to adjust the position of the plate 20, as will be understood. Except for this adjustability of the nut the operation of the differential feed is the same as that disclosed in my said application for patents, the nut being rotated by the feed screw and a longitudinal feeding movement being effected at a lower rate than the pitch of said screw. I contemplate a differential feed equivalent to two hundred threads per inch, which will be secured by making the thread on the nut and screw of the same pitch, but of opposite direction, and by making the nut of twice the diameter of the screw. When it is desired to secure a direct feed of the carriage, the block 11 is shifted rearwardly on the spring 10, so as to permit the feed nut 14 to engage the feed screw as with the ordinary arrangement.

Having now described my invention, what I claim as new and desire to secure by Letters Patent is as follows:—

1. In differential feed mechanism, the combination with a feed screw, of a rotatable nut coöperating therewith and having a variable effective diameter, and means for adjusting the nut to vary the effective diameter thereof, substantially as set forth.

2. In differential feed mechanism, the combination with a feed screw, of a nut having a convex surface coöperating with the feed screw, and means for changing the inclination of the nut, so as to vary its effective diameter, substantially as set forth.

3. In differential feed mechanism, the combination with a feed screw, of a rotating nut coöperating therewith and presenting a threaded surface of varying diameter, and means for adjusting the position of said nut with reference to the feed screw, substantially as set forth.

4. In differential feed mechanism, the combination with a feed screw of a rotatable threaded member adapted to mesh therewith and having varying diameters in parallel planes, and means for holding the same with its axis at varying angles to the axis of the screw, to bring different diameters of the said member into mesh with the said screw, substantially as set forth.

5. In differential feed mechanism, the combination with a feed screw of a rotatable threaded member adapted to mesh therewith and having a circular cross section in one plane, and convex surfaces in a plane at right angles thereto, means for mounting the member with the last named plane parallel to the feed screw, and means for adjusting the angular position of said member in said plane, substantially as set forth.

6. In a phonograph, the combination with a traveling carriage and a feed screw, of a rotatable nut connected to the carriage and presenting an operating surface of varying diameter to the feed screw, and means for adjusting the angular position of the nut in a plane parallel to the feed screw, substantially as set forth.

7. In a phonograph, the combination with a traveling carriage and a feed screw, of a rotatable nut connected to the carriage presenting an operating surface of varying diameter, means for adjusting the position of the nut with respect to the feed screw, a fixed nut also connected to the carriage and means for alternately engaging the rotating and fixed nuts with the feed screw, substantially as set forth.

8. In a phonograph, the combination with a traveling carriage and a feed screw, of a spring connected to the carriage, an adjustable rotating nut and a fixed nut both movably mounted on said spring, and adapted to alternately engage the feed screw, substantially as set forth.

9. In a phonograph, the combination with a movable carriage, and a feed screw, of a spring connected to the carriage, a sliding block mounted on said spring and movable with respect to the same, and an adjustable rotary nut and a fixed nut carried by said block and adapted to alternately engage the feed screws, substantially as set forth.

10. In a phonograph, the combination with a movable carriage and a feed screw, of a spring connected to the carriage, a sliding block mounted on said spring and movable with respect to the same, an adjustable rotary nut and a fixed nut carried by said block and adapted to alternately engage the feed screw, and means for limiting the movement of the block on said spring, substantially as set forth.

11. In a phonograph, the combination with a movable carriage and a feed screw, of a spring connected to the carriage, a block mounted on said spring, a plate secured to the block, but pivotally movable with respect to the same, and a rotating nut mounted on said plate and presenting a convex threaded engaging surface, substantially as set forth.

12. In a phonograph, the combination with a movable carriage and a feed screw, of a spring connected to the carriage, a block mounted on said spring, a plate secured to the block, but pivotally movable with respect to the same, a rotating nut mounted on said plate, and presenting a convex threaded engaging surface, and an adjusting screw for adjusting the pivotal position of the plate with respect to the block, substantially as set forth.

This specification signed and witnessed this 13 day of Jan. 1908.

HERMAN WOLKE.

Witnesses:
 FRANK D. LEWIS,
 H. H. DYKE.